United States Patent [19]

Horan

[11] 4,071,173

[45] Jan. 31, 1978

[54] COVER ENCLOSING FLAT SIDED BUTTON FOR ACTUATION PREVENTION

[75] Inventor: Paul F. Horan, Huntington, Conn.

[73] Assignee: VCA Corporation, Baton Rouge, La.

[21] Appl. No.: 743,589

[22] Filed: Nov. 22, 1976

[51] Int. Cl.[2] .............................................. F16K 35/10

[52] U.S. Cl. ................................ 222/321; 222/402.11

[58] Field of Search ......................... 222/182, 383-385, 222/321, 340, 341, 402.11, 153

[56] References Cited

U.S. PATENT DOCUMENTS

| | | | |
|---|---|---|---|
| 3,591,128 | 7/1971 | Ramis | 222/402.11 |
| 3,937,368 | 2/1976 | Hoagland | 222/402.11 |

*Primary Examiner*—Stanley H. Tollberg

*Attorney, Agent, or Firm*—Donald L. Johnson; John F. Sieberth; David L. Ray

[57] ABSTRACT

An actuator assembly for a dispensing device including a cap body piece for engagement with a threaded container neck having a series of tabs therein, an operable dispensing button with a discharge orifice, the button having a series of flat sides and one rounded side for receipt within the series of tabs, a cover piece enclosing the button which exposes a portion of the button for finger engagement, and a guide slot in the cover piece to prevent relative movement between the button and the cover.

8 Claims, 4 Drawing Figures

COVER ENCLOSING FLAT SIDED BUTTON FOR ACTUATION PREVENTION

BACKGROUND OF THE INVENTION

This invention relates to actuator caps for small liquid dispensers and more particularly to caps which are mounted or secured in place by means of screw threads. Dispensing containers of the hand-held variety, for example, aerosol or spray pump types, are used quite commonly for packaging and dispensing a multiplicity of products. Many of the products dispensed could cause harm to uninformed users such as children. Products dispensed may include paint, lacquers, oil, hair spray, insecticide, cleansers, paint removers, oven cleaners, etc. Obviously, due to the hazardous nature of such materials, unauthorized utilization of such should be prevented.

Fortunately, there are many so-called "child-resistant" devices presently on the market to prevent dispensing of harmful products by children. However, most of these devices rely upon either the difference of strength or manual coordination between an adult and a child. Such reliance often results in frustration for adults who do not have the strength and manual dexterity even though they have the mental maturity to affect dispensing of the product. This is especially true of persons suffering from arthritis or other debilitating diseases. Thus, there is a need for a child-resistant actuator which may be utilized on dispensing containers which do not rely on any difference of strength or manual coordination between an adult and a child.

It is, therefore, an object of the invention to provide a child-resistant device which may be utilized on dispensing containers which is highly child-resistant but which at the same time is easily used by adults--indeed the actuator of this invention is particularly suitable for use even by adults suffering from physical disabilities of the hands.

THE INVENTION

An actuator assembly for a dispensing device including a cap body piece for engagement with a threaded container neck having a series of tabs therein, an operable dispensing button with a discharge orifice, the button having a series of flat sides and one rounded side for receipt within the series of tabs, a cover piece enclosing the button which exposes a portion of the button for finger engagement, and a guide slot in the cover piece to prevent relative movement between the button and the cover.

DESCRIPTION OF THE PREFERRED EMBODIMENTS

Figure 1:
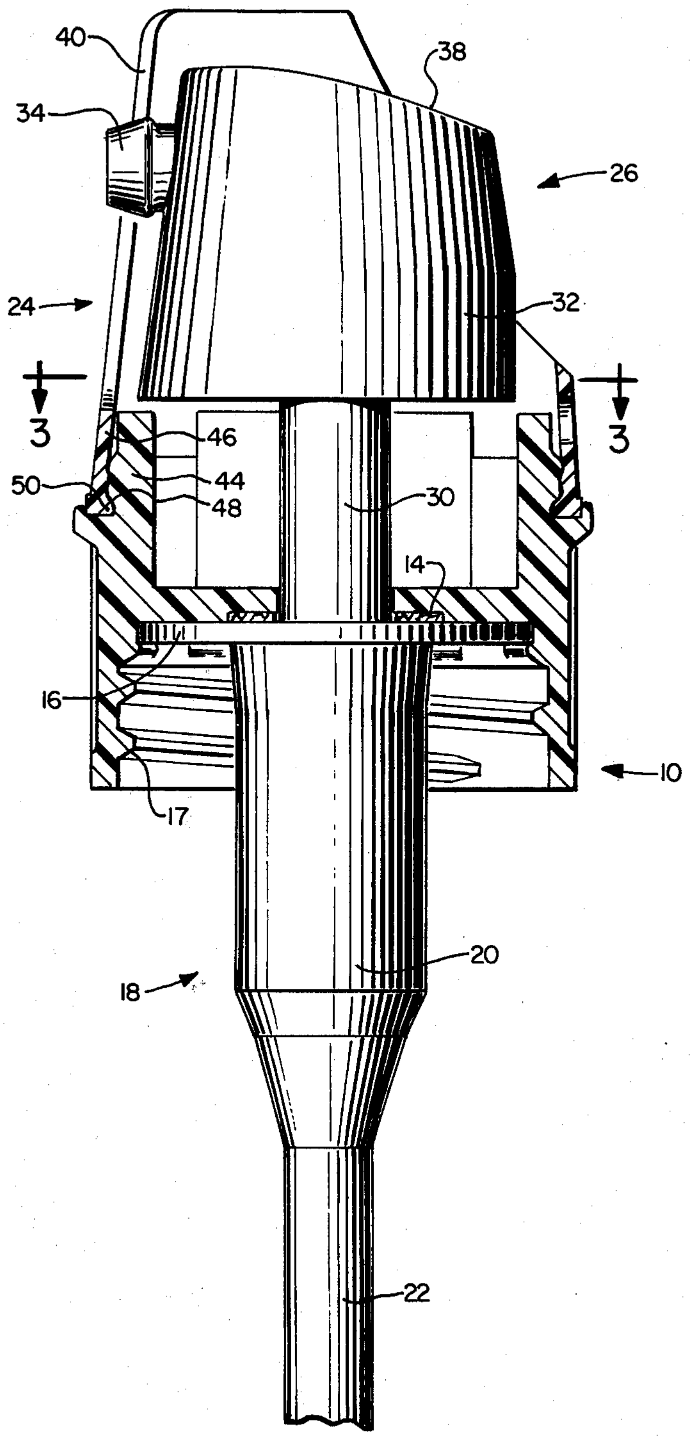
FIG. 1 is a partly-sectional, side elevational view of the assembly of the present invention.

As shown in the drawings, the actuator includes a cap and dispensing pump assemblage which is intended to be removably mounted on a container of the type having a threaded neck. Such containers are in the form of glass or plastic bottles, and are well known in the art.

The actuator cap assemblage comprises a cap body piece designated generally by the numeral 10, having internal screw threads 12 arranged for engagement with the usual threaded neck of a bottle. The cap body piece 10 has an internal annular flange 14 against which there is fitted a cooperable annular flange 16 of a pump assemblage designated generally by the numeral 18.

The pump assemblage 18 comprises a plastic housing 20 in which there is a cylinder and piston or plunger (not shown), said housing having a dependent dip or siphon tube 22 arranged to extend into the container to the bottom thereof. The pump assemblage 18 may be of any usual type, one suitable for use in the present actuator cap assemblage being that described in detail in the U.S. Pat. of O'Donnell and Steiman, No. 3,159,316, dated Dec. 1, 1964, and entitled, "Atomizer Pump."

When the actuator assemblage is mounted on a container, the body piece 10 will be screwed down tightly so that the top lip of the container opening engages the annular flange 16 of the pump assemblage 18 thereby to provide a seal which prevents leakage of the container contents. For such arrangement the body piece 10 may have various different rotative positions on a container, depending on the disposition of the internal screw threads 12 as well as the disposition of the cooperable external screw threads on the container neck.

In accordance with the present invention, there is provided on the body piece 10 an operable button having at one side a discharge orifice, which button is both vertically movable and turnable or rotatably movable on the body piece 10, as well as a cover piece which encloses the body piece and is also mounted on the body piece 10. The cover piece provides clearance for the side discharge orifice of the button and is frictionally held by the body piece in such a manner that it may be rotatably adjusted with the button to enable these two to be turned so as to orient them with respect to the container and body piece 10. Aside from adjustable rotative movement, the cover piece does not have any other movement but instead is rigidly and securely mounted on the body piece 10.

The cover piece is indicated generally by the numeral 24 and the operable button is indicated at 26. The button 26 is secured to a vertically movable plunger shank 30 on pump assemblage 18. The flange 16, cylinder 20 and shank 30 constitute means for movably mounting the button 26 on the cap body piece 10.

The button 26 comprises a conical body 32 having a projecting side orifice or nozzle 34 whereby liquid passing up through the hollow plunger shank 30 flows upward through passageways (not shown) and conical body 32 and is ejected from orifice 34, either in the form of a fine spray or else as a stream of viscous liquid substance. The conical body 32 has a sloping top surface 38 for engagement by the finger of the user, and it will be understood that (as is conventional) the pump assemblage 18 includes a plunger return spring (not shown) which normally maintains the shank 30 of the button 32 in the raised, non-discharging position of FIG. 1.

The cover piece 24 is also of conical configuration, having in one side wall a vertical slot 40 in which nozzle 34 is guided, and with which it cooperates to prevent relative turning movement between the button and the cover piece.

In accordance with the invention, a friction mounting is provided on the cover piece 24 and cap piece 10 which yieldably holds the cover piece and button 32 in different adjusted rotative position with respect to the body piece thereby to enable the cover piece and button to be rotatably adjusted with respect to the container on which the body piece is screwed. The friction mounting comprises inner fitting rim portions 44 and 46 of the body and cover pieces, said rim portions having internal and external shoulders 48 and 50 respectively, which are respectively of smaller and larger diameters to provide an inner lock between the cover and body piece while at the same time enabling adjustable, rotatable movement of the cover piece to be affected with respect to the body piece.

The cover 24 and body pieces 10, as well as the button body 32 are molded out of resilient plastic substance such as polyethylene or similar formulations, and at least one of the inner locking pieces are sufficiently yieldable to enable a snap fit or assemblage to be affected. Preferably, both the body piece 10 and cover piece 24 are resilient, whereby both rim portions yield to a slight extent to enable the assembly of these to be easily affected.

Once the body and cover pieces are assembled they do not normally come apart but instead the cover piece provides a guide as well as a protective guard for the button 32, preventing inadvertent operation of the button and insuring that the nozzle or orifice is always properly pointed or oriented. At the time the actuator assemblage is mounted on the container, the latter may be oriented with respect to the cover piece 24 and nozzle 34 by merely turning the cover piece in either direction while holding the container.

Figure 2:
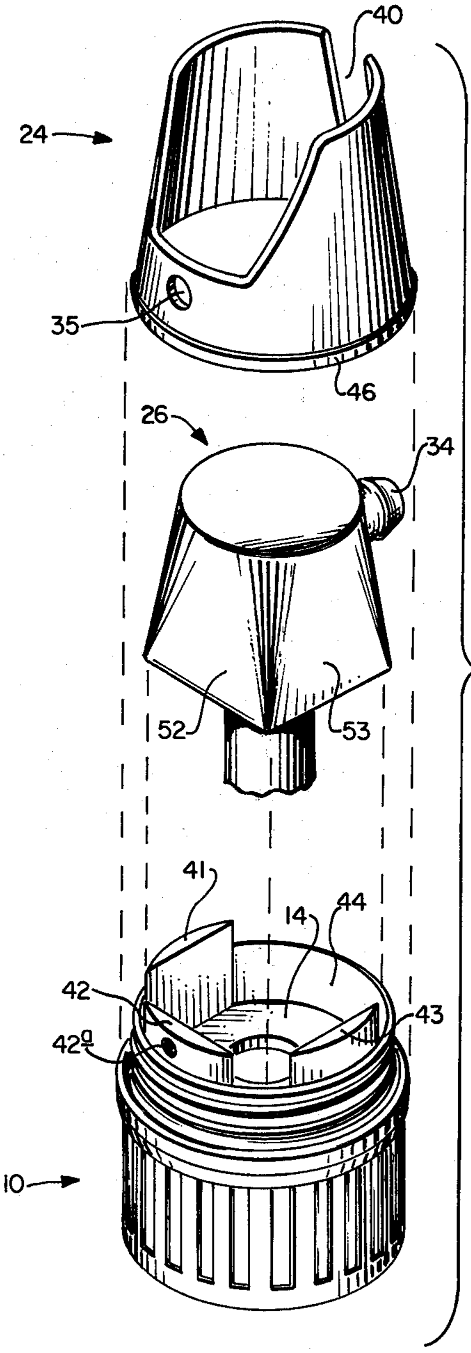
FIG. 2 is an exploded perspective view of the assembly of the present invention.

In FIG. 2 the body piece 10 can be seen to have three tabs, 41, 42 and 43, projecting upwardly from flange 14. Tabs 41 thru 43 can be seen to have an arcuate cross section and a flat upper portion. Tab 42 has a protuberance 42*a* thereon for receipt in hole 35 of cap 24.

Figure 3:
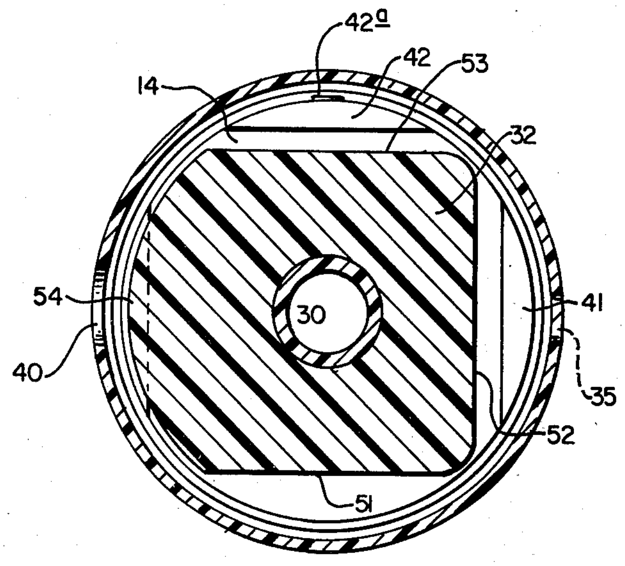
FIG. 3 is a cross-sectional view taken along lines 3—3 of FIG. 1, and FIG. *3a* is a rotated cross-sectional view taken along line 3—3 of FIG. 1.
Figure 3A:
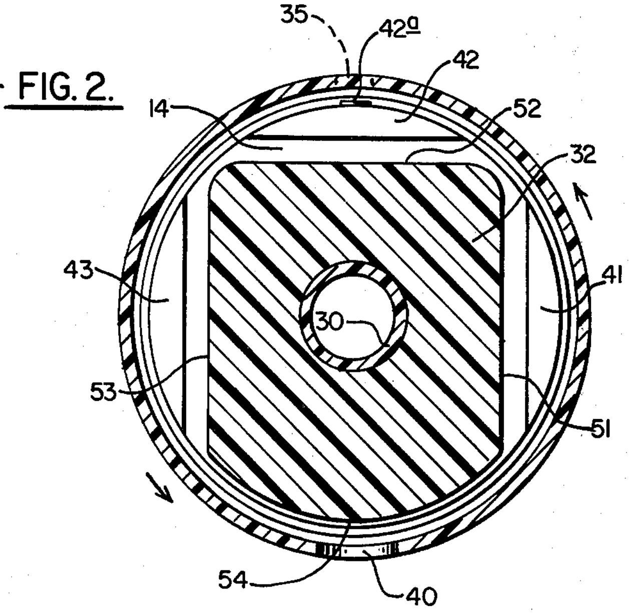

Actuator button 26 can be seen in FIGS. 3 and 3*a* to have three flat sides, 51, 52 and 53, and one curved side 54. When turned in the position shown in FIG. 3*a*, the three flat sides of the actuator button are aligned opposite the three tabs 41, 42 and 43. The dimensions of actuator button 26 are such that the three flat sides thereof will fit within the interior of the three tabs 41, 42 and 43. Furthermore, the curved edge of actuator button 26 fits within rim portion 44. Thus, when the actuator button 26 is rotated to the position of FIG. 3*a*, the button can be depressed and it will move downwardly until it strikes flange 14.

However, when the actuator button is in any position other than that shown in FIG. 3*a*, for example that shown in FIG. 3, the button when depressed strikes the top of one or more of the tabs 41, 42 and 43, thus preventing the downward movement of the button and preventing dispensing of the fluid. To enable one to easily locate the operative position, hole 35 is located in the outside of cover 24 and protuberance 42*a* is located on tab 42. The protuberance may be painted red or may be merely replaced with red or colored spot. Thus, to find the operative position, one can turn cover 24 and its associated button 26 until the protuberance or marking 42*a* appears in the hole 35. At this point, the pump assembly is in the operative position and fluids can be dispensed therefrom.

Having fully described the present invention, it is desired that it be limited only within the spirit and scope of the following claims.

What is claimed:

1. An actuator assembly for a dispensing device comprising, in combination:

a. a cap body piece having means for attachment to a container and a series of tab means projecting upwardly from said cap body piece;

b. an operable dispensing button and means movably mounting said button on said cap body piece for both turning and axial movement, said button having a series of flat sides and one curved side, said flat sides being arranged to be received within said tab means when properly positioned;

c. cover means enclosing said button adapted to expose a portion of the button for finger engagement; and, d. guide means on said button and said cover piece for preventing relative turning therebetween while enabling relative axial movement to be had.

2. The assembly of claim 1 wherein said container has a threaded neck and said cap body piece has screw threads therein for engagement with said threaded neck.

3. The assembly of claim 2 wherein said cap body has an exterior, peripheral surface for engagement by the finger to enable said body piece to be manually screwed onto said container neck.

4. The assembly of claim 3 wherein said cap body piece has side walls connected by flange means having a hole therein for receipt of pump plunger means.

5. The assembly of claim 4 wherein said series of tab means project upwardly from said flange means.

6. The assembly of claim 5 wherein said tab means has a flat upper surface and flat interior walls.

7. The assembly of claim 6 wherein a friction mounting means is located on said cover piece and a portion of the cap body piece which is located entirely above the said finger engagable peripheral surface thereof, yieldably holding said cover piece and button in different adjusted rotative positions with respect to the body piece, thereby to enable the cover piece and button to be rotatably adjusted with respect to a container on which the body piece is screwed all without closing said peripheral surface or interfering with the screwing on or unscrewing of said cap body piece.

8. The assembly of claim 1 wherein said button has discharge nozzle means.

* * * * *